(12) United States Patent
Hanna

(10) Patent No.: US 6,826,706 B2
(45) Date of Patent: Nov. 30, 2004

(54) TIMER/TIMEOUT EVALUATION SYSTEM THAT SAVES THE COUNTS OF ALL TIMERS WHEN AT LEAST ONE TIMER HAS TIMED OUT

(75) Inventor: Stephen Dale Hanna, Longmont, CO (US)

(73) Assignee: International Buniess Machines Corporation, Armonk, NY (US)

( * ) Notice: Subject to any disclaimer, the term of this patent is extended or adjusted under 35 U.S.C. 154(b) by 742 days.

(21) Appl. No.: 09/879,589

(22) Filed: Jun. 12, 2001

(65) Prior Publication Data

US 2002/0188883 A1 Dec. 12, 2002

(51) Int. Cl.[7] .............................................. G06F 1/04
(52) U.S. Cl. ........................ 713/502; 358/1.15; 714/44
(58) Field of Search ........................ 358/1.15; 713/502; 714/44

(56) References Cited

U.S. PATENT DOCUMENTS

| | | | |
|---|---|---|---|
| 5,471,564 A | 11/1995 | Dennis et al. | |
| 5,537,541 A | * 7/1996 | Wibecan | ....................... 714/45 |
| 5,577,213 A | 11/1996 | Avery et al. | |
| 5,740,497 A | 4/1998 | Yamada et al. | |
| 5,745,663 A | 4/1998 | Takagi | |
| 5,870,533 A | 2/1999 | Takagi | |
| 5,935,262 A | * 8/1999 | Barrett et al. | ................... 714/46 |

OTHER PUBLICATIONS

"Realtime Throughput Measurement," IBM Technical Disclosure Bulletin, Mar. 1984, pp. 5688–5689.

* cited by examiner

*Primary Examiner*—Thomas Lee
*Assistant Examiner*—Albert Wang
(74) *Attorney, Agent, or Firm*—Ohlandt, Greeley, Ruggiero & Perle, LLP; Scott W. Reid

(57) ABSTRACT

An apparatus for evaluating at least one timer in the event of a timeout condition in a system includes circuitry that generates an indication that certain system conditions have occurred, clock circuitry, enabled by the indication, that generates a timeout counter enable signal, and a number of timer units, coupled to the clock circuitry, where each of the timer units is incremented an incrementing signal and reset by a monitored signal that represents conditions in the system. The apparatus includes comparison circuitry coupled to the timeout units, such that when at least one of the timer units reaches a predetermined count, the count, or the maximum count reached to this point, of each of the timer units is stored.

12 Claims, 5 Drawing Sheets

TIMER/TIMEOUT EVALUATION SYSTEM THAT SAVES THE COUNTS OF ALL TIMERS WHEN AT LEAST ONE TIMER HAS TIMED OUT

FIELD OF THE INVENTION

This invention pertains to a system for evaluating operational parameters, and in particular for evaluating various timers and timeout conditions.

BACKGROUND OF THE INVENTION

Evaluating timers and timeout conditions in circuitry usually requires setting up timing circuitry specifically designed to evaluate the timer or the timeout condition. This may include providing a signal to increment a timer and circuitry to provide notice in the event that an error condition has occurred, for example, the timer overflows indicating that a time period has been exceeded or has not been achieved. The timing circuitry may also include a reset signal that resets the timer in the event that the proper conditions have been met.

It would be advantageous to have pre-designed circuitry for this type of evaluation that simply requires setting a few individual parameters, or that even includes a standard set of parameters used for evaluation. Such a system would enable the evaluation of various timeout conditions by allowing the assessment of various timers upon the occurrence of a time out. It would also be advantageous if this could be accomplished without having to set up individual circuits and fixed values for every timer or timeout condition to be evaluated or assessed. It would also be advantageous if the circuitry were capable of evaluating multiple timers or timeout conditions and recording the timed values in the event of a timeout, so that a snapshot of a failing condition may be observed after the failure.

OBJECTS AND ADVANTAGES OF THE INVENTION

It is a first object and advantage of this invention to provide an improved system for evaluating timeout conditions that may occur in a system.

It is a further object and advantage of this invention to provide an improved system for evaluating a timeout condition by further evaluating at least one timer in the event of such a timeout condition by providing circuitry with specific timing functions and predetermined timing conditions which may be adjusted according to the timers and timeout conditions being evaluated.

It is a further object and advantage of this invention to provide circuitry which allows for setting initial or special conditions that must be met before an evaluation or evaluations may begin, or to define evaluation periods.

It is a further object and advantage of this invention to provide circuitry which allows for setting conditions upon which an evaluation or evaluations will terminate, and the values of timers associated with certain timers and timeout conditions are recorded.

It is a further object and advantage of this invention to provide circuitry which allows for varying a common timer clock to match evaluation requirements.

SUMMARY OF THE INVENTION

The foregoing and other problems are overcome and the objects of the invention are realized by methods and apparatus in accordance with embodiments of this invention.

An apparatus for evaluating at least one timer in the event of a timeout condition in a system is disclosed that includes circuitry that generates an indication that certain system conditions have occurred, clock circuitry, enabled by the indication, that generates a timeout counter enable signal, and a number of timer units, coupled to the clock circuitry, where each of the timer units is incremented by an incrementing signal and reset by a monitored signal that represents conditions in the system. The invention includes comparison circuitry coupled to the timeout units, such that when at least one of the timer units reaches a predetermined count, the count, or the maximum count reached to this point, of each of the timer units is stored.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
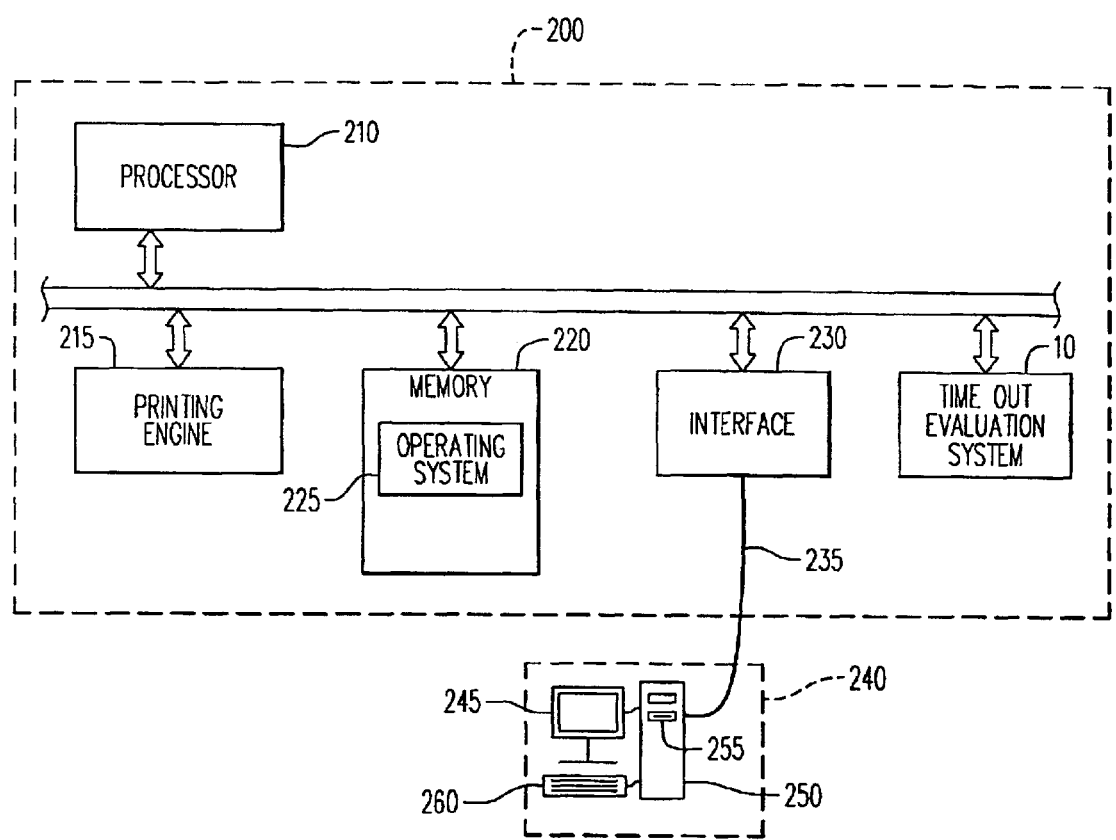
FIG. 1 shows a block diagram of a system incorporating an evaluation system according to the teachings herein.

FIG. 1 shows a block diagram of a system, preferably a printer 200, incorporating a timeout evaluation system 10. Printer 200 includes processor 210 for directing printer operations and a printing engine 215. Printer 200 also includes memory 220 for storing programs, including a printer operating system 225. Memory 220 may also include storage for temporary system operating parameters and temporary data. Printer 200 is connected to other devices through interface 230 and link 235. The other devices may include an external computing device 240 which may be a personal computer or any device capable of communicating with printer 200. External computing device 240 typically includes a display 245, processor 250, storage 255, and keyboard 260.

It should be understood that link 235 is not limited to a specific type of connection to the printer 200, but may include a cable with metal conductors, a fiber optic cable, a network, the Internet, the Public Switched Telephone Network (PSTN), or any link suitable for connecting a device or devices to printer 200.

It should be further understood that the timeout evaluation system 10, while shown as a separate device within printer 200, may be incorporated in other circuitry of the printer 200, for example, the printing engine 215, the interface 230, or any other circuitry suitable for hosting the timeout evaluation system 10.

Figure 2:
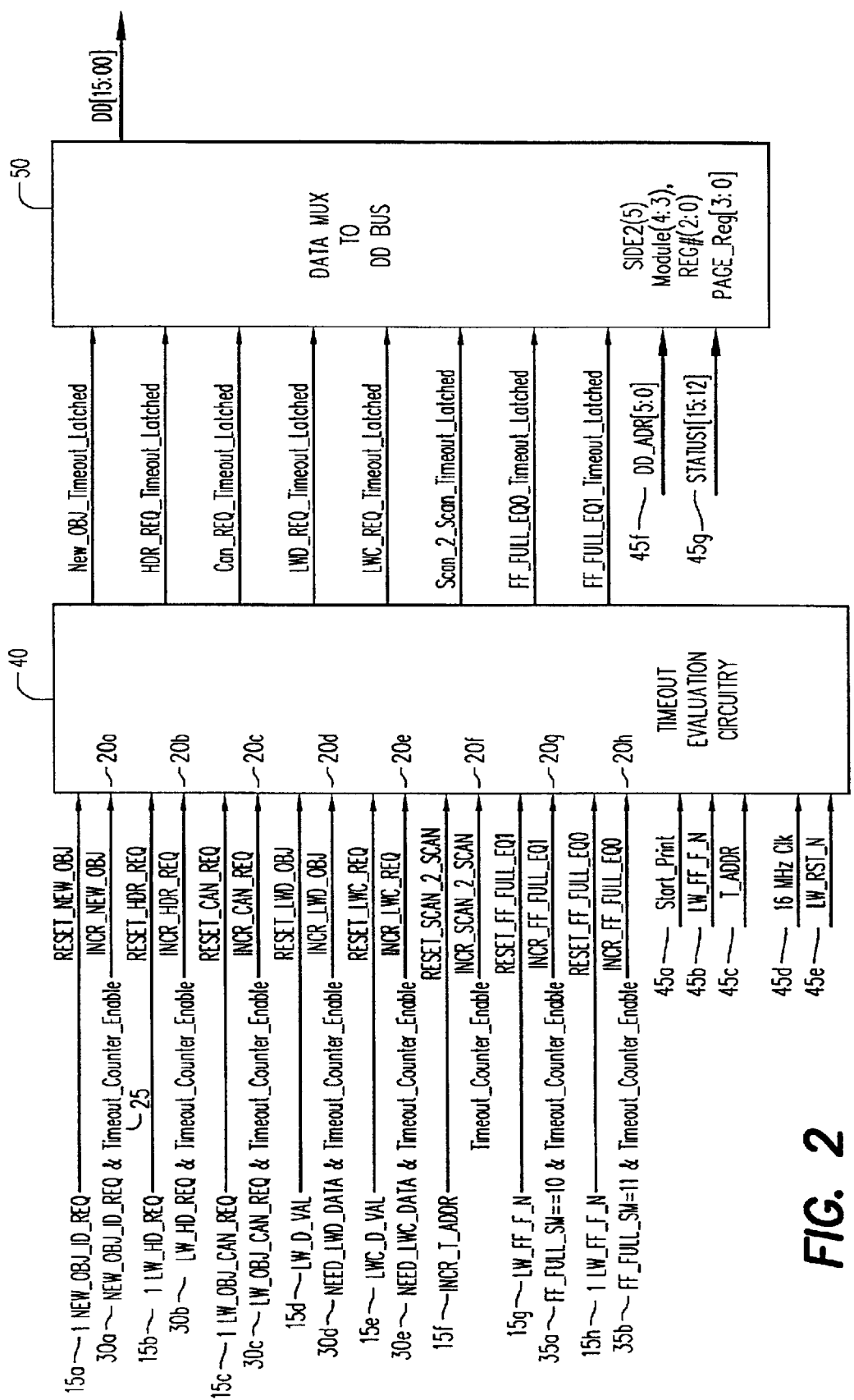
FIG. 2 is a simplified block diagram of the timeout evaluation system.

FIG. 2 is a block diagram of a presently preferred embodiment of the timeout evaluation system 10.

The timeout evaluation system 10 evaluates the time required to accomplish tasks in the printer 200 by monitoring the behavior of signals associated with these tasks and conditions. Signals 15a–15h are associated with tasks the printer 200. The signals are each monitored with respect to a corresponding incrementing signal 20a–20h. Each incrementing signal is synthesized from a Timeout_Counter_

Enable signal 25 generated internally within timeout evaluation circuitry 40, either alone, in combination with other signals 30a–30e from the printer 200, or in combination with other signals 35a–35b generated internally by the timeout evaluation circuitry 40.

For example, the signal labeled ! New_OBJ_ID_REQ (NOT New Object ID Request) 15a is used to generate the signal RESET_NEW_OBJ, used internally by the timeout evaluation system 10. The signal NEW_OBJ_ID_REQ (New Object ID Request) 30a is combined with the internally generated Timeout_Counter_Enable signal 25 by an AND function to generate the internal signal INCR_NEW_OBJ 20a.

System control signals 45a–45g are also provided to the timeout evaluation circuitry 40 and to the data multiplexer 50 from the printer 200. These system control signals are used by the timeout evaluation circuitry 40 for setting initial conditions to be satisfied before signal evaluation begins. Signal 45a resets all the counters 85a–85h and the maximum timer values 95a–95h.

Figure 3A:
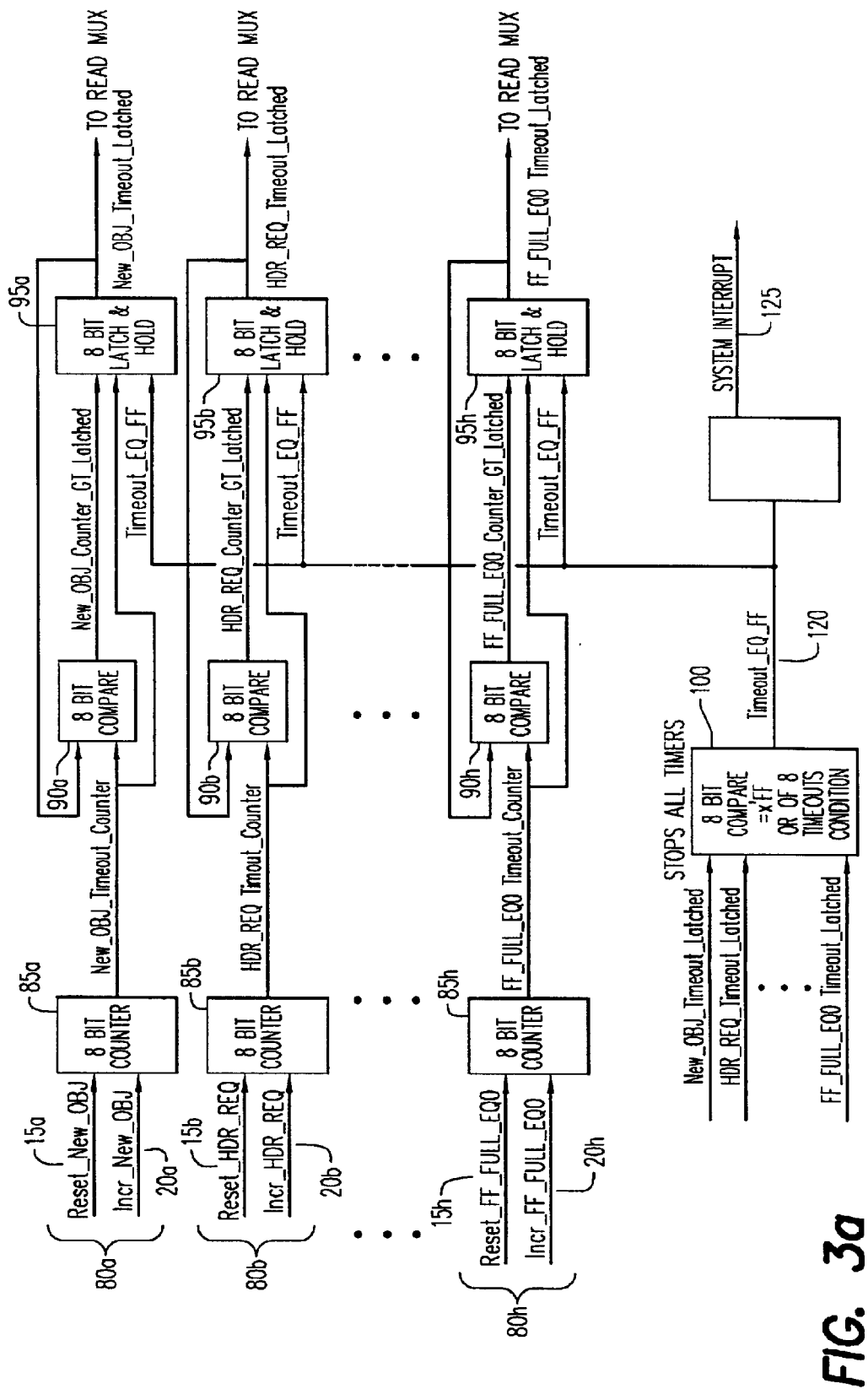
FIGS. 3a and 3b show block diagrams of the timeout evaluation circuitry of FIG. 2.
Figure 3B:
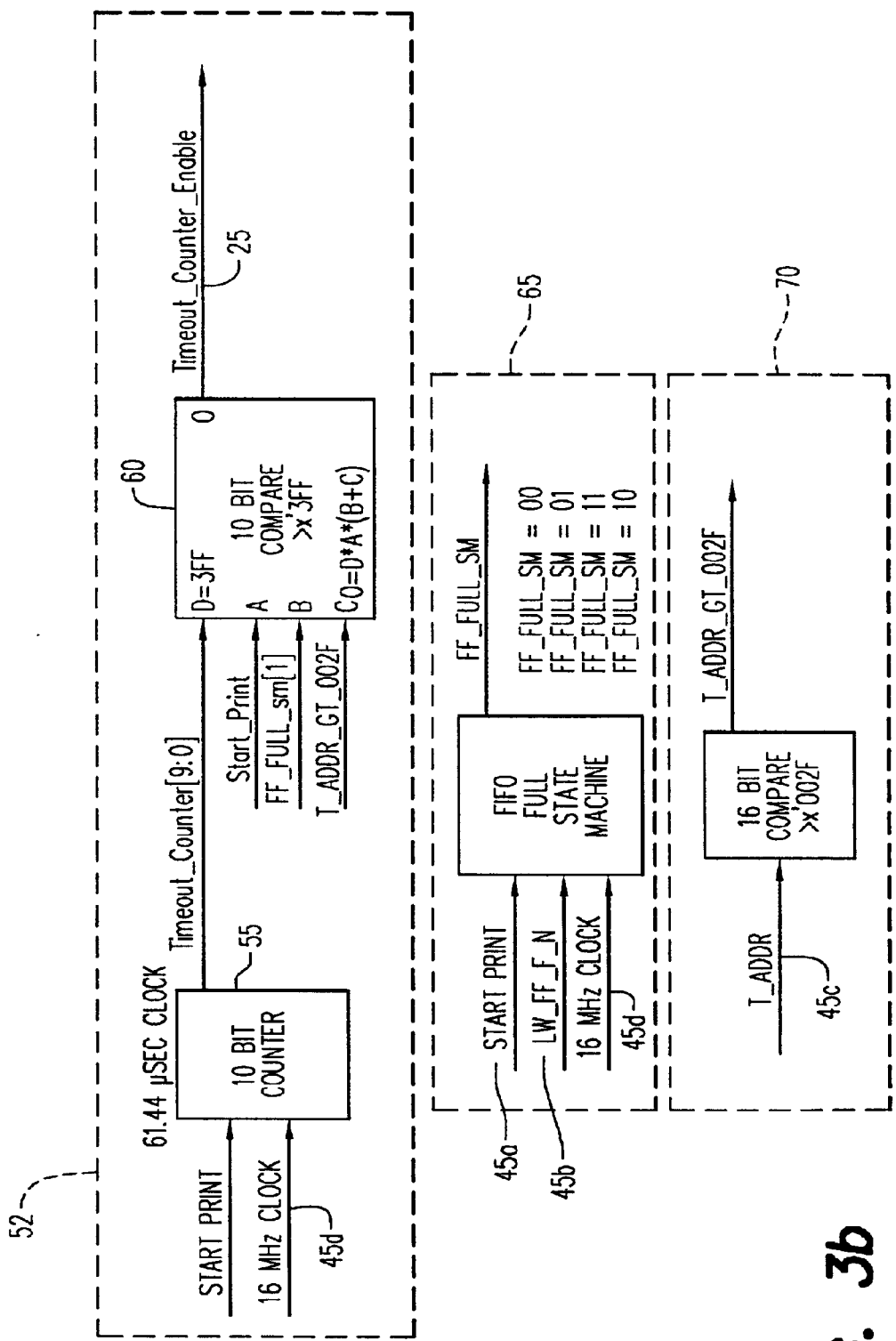

FIGS. 3a and 3b show the components of the timeout evaluation circuitry 40. The components include a clock circuit 52, a state machine 65 for setting initial conditions that enable the clock circuit 52, a 16 bit compare circuit 70, also for setting initial conditions that enable the clock circuit 52, and at least one timeout unit 80a–80h for evaluating timers or timeout conditions as represented by signals 15a–15h.

Individual ones of the incrementing signals 20a–20h increment a corresponding one of the counters 85a–85h each time it is a "1." For example, when a signal being monitored 15a–15h is a "1," it resets the corresponding one of the counters 85a–85h. A latch 95a–95h holds the maximum count achieved by the corresponding one of the counters 85a–85h over multiple counting cycles. If the corresponding counter 85a–85h reaches a predetermined count before being reset, the maximum counts of all counters 85a–85h are held and are made available to the printer 200 through a data multiplexer (mux) 50.

The state machine 65 is configured to recognize certain initial conditions before enabling the clock circuit 52. In a preferred embodiment, the state machine is constructed to recognize that certain conditions have occurred in a particular sequence. The state machine is clocked by, for example, a 16 MHz signal 45d and reset by a Start_Print signal 45a. After the Start_Print signal 45a is active, as the input signal LW_FF_F_N (Line Work FIFO Full Not) 435b changes state, the state machine 65 advances the state of its outputs on the following rising edge of the 16 MHz clock. Upon initialization, the outputs of the state machine 65 are set to 00 and then advance to 01, 11, and 10, respectively, each time the input signal LW_FF_F_N changes state. Once reaching 10, the outputs toggle between 10 and 11 each time the input signal LW_FF_F_N changes state. The output of the state machine 65 is coupled to one input of a compare circuit 60 (e.g., a 10 bit compare circuit).

The 16 bit compare circuit 70 is also used to recognize certain initial conditions for enabling the clock circuit 52. In a preferred embodiment, the 16 bit compare circuit is configured to recognize that a certain number of events have occurred. The compare circuit 70 compares the T_ADDR signals 45c with a 16 bit pattern and delays enabling the timer evaluation system until the signals match the 16 bit pattern. In this embodiment, the T_ADDR signals 45c represent the number of line scans completed by the printer. The 16 bit pattern used is 002F hex and therefore enablement of the timer is delayed until the printer completes its $48^{th}$ line scan. Like the output of the state machine 65, the output of the 16 bit address compare circuit 70 is coupled to the 10 bit compare circuit 60.

The clock circuit 52 is composed of a 10 bit counter 55 clocked by a 16 MHz signal 45d and reset by a start print signal 45a, both provided by the printer 200. The output from the 10 bit counter 55 is coupled to a 10 bit compare circuit 60. The output of the 10 bit address compare circuit 60 is the timeout counter enable signal 25 mentioned above, which is used either alone or in combination with other signals as the incrementing signals 20a–20h. The frequency of the Timeout_Counter_Enable signal 25 is determined by the 10 bit compare pattern utilized by the 10 bit compare circuit 60, which in this embodiment is 3FF hex.

The timeout evaluation circuitry 40 further includes at least one timer unit. FIG. 3a shows a preferred embodiment that comprises eight timer units, 80a–80h. The timer units serve as timers to time certain events in the printer 200 by monitoring signals associated with those events. Because the structure of each timer unit is the same, only the structure of timer unit 80a will be described. The timer unit 80a is comprised of an 8 bit timeout counter 85a that has as its inputs the incrementing signal (INCR_NEW_OBJ 20a) and the corresponding signal being evaluated (RESET_NEW_OBJ 15a). The output of the 8 bit counter 85a is coupled to an 8 bit compare circuit 90a and to an 8 bit latch and hold register 95a. The output of the 8 bit compare circuit 90a is coupled to the 8 bit latch and hold register 95a and loads the output value of the 8 bit counter 85a into the 8 bit latch and hold register 95a if the output value of 85a exceeds the value currently stored in the 8 bit latch and hold register 95a. The 8 bit latch and hold register 95a is initialized to a value of 00 when the Start_Print signal 45a equals 0.

The outputs of all the 8 bit latch and hold registers 95a–95h are coupled to the data mux 50 (FIG. 2) and to a circuit 100 that performs an 8 bit compare on each output. In the event that the output of any latch and hold register 95a–95h reaches a predetermined value, all latch and hold register 95a–95h outputs are held at their present state and are made available through the data mux 50.

The operation of the timeout evaluation system 10 will now be described with reference to FIGS. 3a, 3b, and 4.

In the present invention, the timeout evaluation circuitry is preferably embodied in a programmable device, for example, a field programmable gate array, and the compare values are set during the design of the programmable device.

Figure 4:
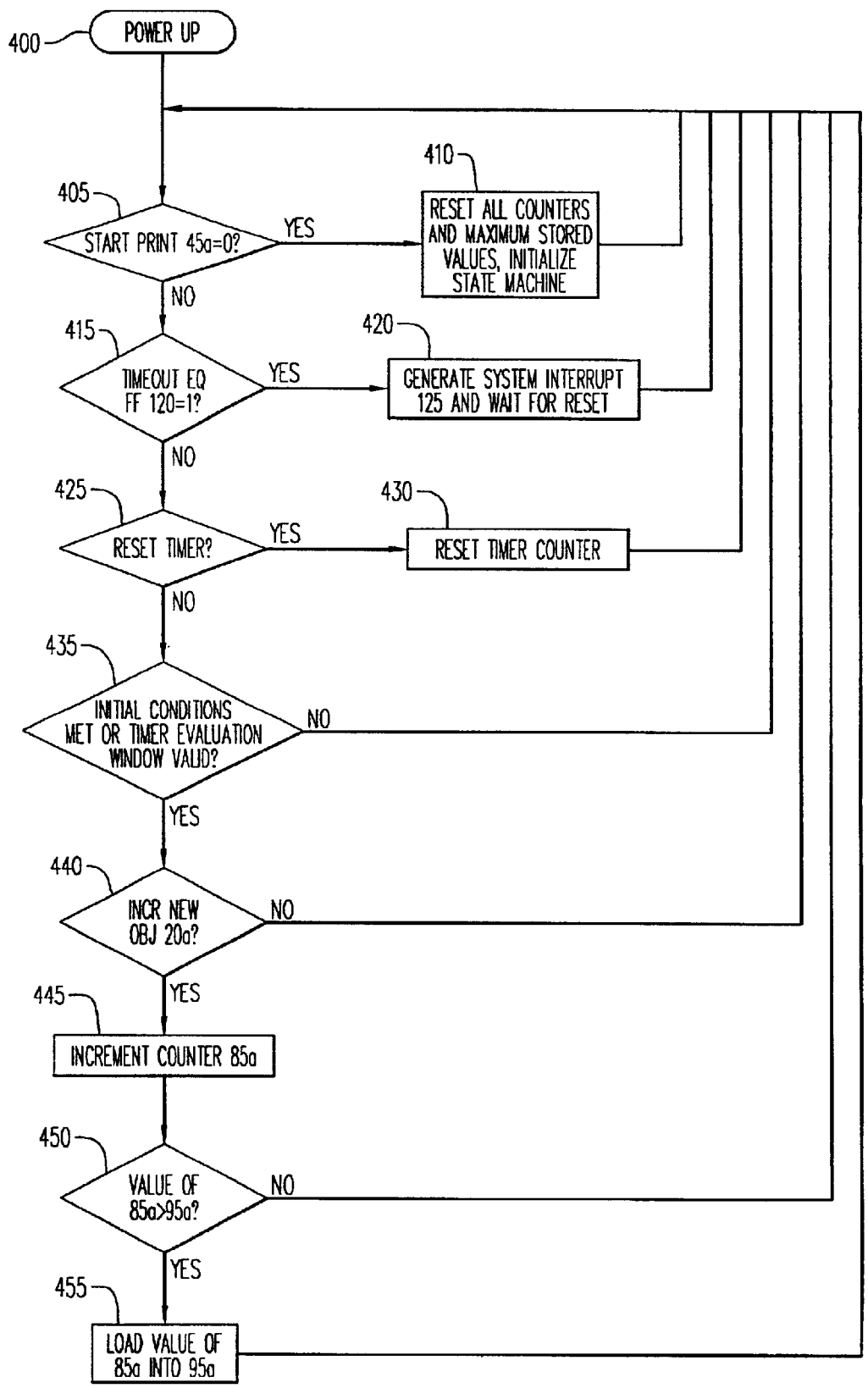
FIG. 4 is a flow diagram illustrating the operation of the timeout evaluation system.

Upon power up, shown in step 400 of FIG. 4, if signal Start_Print 45a is a "0" (Step 405) the outputs of counters 85a–h, 55, and 8 bit latch and hold circuits 95a–95h are set to 0, the compare circuits 60, 70, 100 are loaded with their respective compare values, also known as maximum stored values, and the state machine 65 is initialized as shown in step 410.

It should be understood that the maximum stored values for compare circuits 60, 70, 100 are not limited to the examples described herein but may include any compare value that provides a suitable output from the compare circuits 60, 70, 100.

It should also be understood that the compare value for compare circuit 60 may be selected such that the Timeout_Counter_Enable signal 25 has a specific frequency and duty cycle.

If, after Start_Print 45a becomes a "1," signal Timeout_EQ_FF is a "1," (Step 415) the circuitry generates a system interrupt 125 and waits for a system reset as shown in Step 420. If signal Timeout_EQ_FF is not a "1," and the signal RESET_NEW_OBJ 15a is a "1." (Step 425) counter 85a is reset as shown in step 430.

Also upon initialization, the 10 bit counter 55 begins counting, driven by the 16 MHz Clock signal 45d. The output of the 10 bit compare circuit 60 is suppressed until the initial conditions determined by the state machine 65 and the 16 bit compare circuit 70 are satisfied. As shown in FIG. 3b, the initial conditions include the output of the state machine 65 reaching 11 for the first time and the output of the 16 bit compare circuit 70 becoming active. The output of the 10 bit compare circuit 60 may also be suppressed by other "non initial" conditions, for example, when signal T_ADDR 45c is less than or equal to 002F.

After the state machine 65 is initialized, it remains idle until the Start_Print signal 45a becomes active and the LW_FF_F_N signal 45b indicates that the line word FIFO in the printer 200 is full. The state machine then begins toggling its outputs each time the LW_FF_F_N signal 45b changes state, thus indicating that the FIFO is toggling between a not full and a full state. Upon the signal toggling to the not full state after the first time reaching a full state, the state machine's outputs become "11" and then toggles between "10" and "11" thereafter. As mentioned above, the output of the state machine 65 reaching "11" for the first time satisfies one of the initial conditions for the 10 bit compare circuit 60.

After the 16 bit compare circuit 70 is initialized, it performs a 16 bit compare of the T ADDR signal 45c. The T ADDR signal 45c represents the number of line scans completed by the printer. The 16 bit pattern used for comparison is preferably "002F" hex. As a result, the output of the 16 bit compare circuit becomes active when T ADDR 45c becomes greater than "002F" hex, indicating that the printer has completed 48 line scans. This event satisfies another initial condition for the 10 bit compare circuit 60.

Once the initial conditions for the 10 bit compare circuit 60 are satisfied, each time the output of the 10 bit counter 55 reaches the 10 bit compare value, in this embodiment preferably 3FF hex, the output signal Timeout_Counter_Enable 25 becomes a "1" for one clock cycle.

The Timeout_Counter_Enable signal 25 is used either alone, in combination with other external signals 30a–30e from the printer 200, or in combination with other internally generated signals 35a–35b, to generate incrementing signals 20a–20h.

As mentioned earlier, timeout conditions in the printer 200 are evaluated by monitoring signals 15a–15h associated with system conditions. Signals 15a–15h are coupled to 8 bit counters 85a–85h respectively, as are incrementing signals 20a–20h. Because the operation of timeout units 80a–80h are the same, only the operation of timeout unit 80a will be described.

Incrementing signal 20a increments 8 bit counter 85a, while signal 15a resets 8 bit counter 85a each time it equals "1," thus starting another timing cycle. The 8 bit compare circuit 90a loads the output of the 8 bit counter 85a into the 8 bit latch and hold circuit 95a if the value of the output of the 8 bit counter 85a is greater than the value held in the 8 bit latch and hold circuit 95a (steps 445 and 450. FIG. 4). Thus, the 8 bit latch and hold circuit 95a holds the maximum count achieved by the counter over multiple counting cycles. The outputs of the 8 bit latch and hold circuits 95a–95h are coupled to an 8 bit compare circuit 100. If any of the outputs reaches a predetermined count before being reset, in this embodiment preferably FF, the 8 bit compare circuit 100 generates a signal Timeout_EQ_FF which latches the outputs of all the latch and hold circuits 95a–95h, as shown in steps 445 and 450 of FIG. 4B. The printer 200 is able to read the latched outputs of the 8 bit latch and hold circuits 95a–95h through the data mux 50 by using signals 45f and 45g.

For example, the printer 200, as part of its operation, may initiate a new request for an object identifier by asserting the NEW_OBJ_ID_REQ signal 30a. In this example, timer unit 80a is configured to monitor signals associated with this task. While NEW_OBJ_ID_REQ 30a is asserted, each time the Timeout_Counter_Enable signal 25 equals "1," the internal signal INCR_NEW_OBJ 20a equals "1," and counter 85a is incremented. Counter 85a continues to be incremented until one of two conditions occur. If the new object ID request is satisfied, the ! NEW_OBJ_ID REQ signal 15a, also called RESET_NEW_OBJ, is de-asserted and becomes a "1" which resets the counter 85a. If the counter 85a reaches a certain count, in this example, FF, this indicates that the time to satisfy the request was exceeded, and thus a timeout condition has occurred. Upon counter 85a reaching, in this example, FF, the counts of all counters 85a–85h are latched and made available through the data mux 50. Thus, upon the occurrence of a timeout of the new request for an object identifier, the timeout condition may be investigated by evaluating the outputs of the other timer units 80b . . . 80h.

In the event that the signal RESET_NEW_OBJ 15a is not a "1" and the initial conditions for the 10 bit compare circuit 60 are not satisfied, or a timer evaluation window is not valid, as shown in step 435, the system proceeds through steps 405, 415, and 430 until the initial conditions for the 10 bit compare circuit 60, or a timer evaluation window are valid. Upon either of the states in step 435 being satisfied, and the INCR_NEW_OBJ signal 20a going active (step 440), the counter 85a is incremented (step 445). The value of counter 85a is compared with the value held in the eight bit latch and hold circuit 95a as shown in step 450, and if the value in counter 85a is larger than the value in the eight bit latch and hold 95a, the value in counter 85a is loaded into the eight bit latch and hold circuit 95a (Step 455).

While the invention has been described in the context of a programmable device, it should be understood that the invention could be implemented as a software program, as one or more hardware devices, or as a combination of hardware, software, programmable devices or any other technology appropriate for implementing the functions described herein.

Although described above in the context of specific signal names, printer functions, printer architectures and the like, those skilled in the art should appreciate that these are exemplary and indicative of presently preferred embodiments of these teachings, and are not intended to be read or construed in a limiting sense upon these teachings.

What is claimed is:

1. An apparatus for evaluating at least one timer in the event of a timeout condition in a system comprising:

first circuitry that generates an indication that certain system conditions have occurred;

clock circuitry, enabled by said indication, that generates a timeout counter enable signal;

a plurality of timer units, coupled to said clock circuitry, wherein an output of each of said plurality of timer units is incremented by individual ones of a plurality of incrementing signals and reset by individual ones of a plurality of monitored signals, wherein said monitored signals are representative of conditions in said system; and comparison circuitry coupled to said plurality of timer units, such that when an output of at least one of said plurality of timer units reaches a predetermined count, the count of each of said plurality of timer units is stored.

2. The apparatus of claim 1, wherein said first circuitry comprises circuitry indicating that a sequence of events in said system have occurred.

3. The apparatus of claim 2, wherein said first circuitry comprises a state machine responsive to signals present in said system.

4. The apparatus of claim 1, wherein said first circuitry comprises circuitry indicating that a predetermined number of events in said system have occurred.

5. The apparatus of claim 4, wherein said first circuitry comprises a comparison circuit for comparing signals present in said system with a predetermined number.

6. The apparatus of claim 1, wherein said individual ones of said plurality of incrementing signals are synthesized from said timeout counter enable signal either alone or in combination with other signals from said system.

7. The apparatus of claim 1, wherein each of said timer circuits further comprises:

a counter, incremented by one of said incrementing signals and reset by one of said monitored signals;

a latch circuit coupled to the output of said counter; and a comparison circuit, couple to said counter and to said latch circuit such that the output of said counter is compared to the contents of said latch and loaded into said latch if said output is greater than said contents.

8. The apparatus of claim 1, further comprising a data multiplexer for accessing the stored count of each of said plurality of timer units.

9. A method for evaluating timers or timeout conditions in a system comprising the steps of:

generating an indication that certain system conditions have occurred;

generating a timeout counter enable signal enabled by said indication;

incrementing a plurality of counter circuits by individual ones of a plurality of incrementing signals and resetting said plurality of counter circuits by individual ones of a plurality of monitored signals, wherein said monitored signals are representative of conditions in said system; and comparing the outputs of said plurality of counter circuits, and when at least one of said plurality of counter circuits reaches a predetermined count, latching the output of each of said plurality of counter circuits.

10. The method of claim 9, wherein said certain system conditions comprise a sequence of events that have occurred in said system.

11. The method of claim 9, wherein said certain system conditions comprise a predetermined number of events that have occurred in said system.

12. The method of claim 9, further comprising synthesizing individual ones of said plurality of incrementing signals from said timeout counter enable signal either alone or in combination with other signals from said system.

* * * * *